United States Patent
Thomas

(10) Patent No.: US 11,661,967 B2
(45) Date of Patent: May 30, 2023

(54) MOUNTING DEVICE AND METHOD FOR MOUNTING COMPONENTS

(71) Applicant: United Technologies Corporation, Farmington, CT (US)

(72) Inventor: Michael R. Thomas, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1078 days.

(21) Appl. No.: 16/387,072

(22) Filed: Apr. 17, 2019

(65) Prior Publication Data

US 2020/0332828 A1  Oct. 22, 2020

(51) Int. Cl.
*F16C 11/06* (2006.01)
*F16M 13/02* (2006.01)

(52) U.S. Cl.
CPC ......... *F16C 11/0614* (2013.01); *F16M 13/02* (2013.01)

(58) Field of Classification Search
None
See application file for complete search history.

(56) References Cited

U.S. PATENT DOCUMENTS

| | | | |
|---|---|---|---|
| 2,997,864 A | 8/1961 | Rueb | |
| 5,775,654 A | 7/1998 | Price | |
| 5,954,586 A | 9/1999 | Kirson | |
| 6,203,438 B1 * | 3/2001 | Kirson | F16D 3/32 464/905 |
| 6,383,081 B1 * | 5/2002 | DeBisschop | F16D 3/40 464/905 |
| 6,712,381 B1 | 3/2004 | Moss | |
| 7,140,969 B2 * | 11/2006 | Prucher | F16D 3/387 464/902 |
| 7,144,326 B2 * | 12/2006 | Thompson | F16D 3/30 464/106 |
| 9,296,473 B2 | 3/2016 | Parker | |
| 9,297,409 B2 * | 3/2016 | Kallas | F16C 11/0623 |
| 9,618,053 B2 * | 4/2017 | Bodtker | F16D 3/38 |
| 10,258,818 B2 * | 4/2019 | Wilkinson | A63B 17/04 |
| 11,105,365 B2 * | 8/2021 | Kronenbitter | F16B 9/058 |
| 11,258,158 B2 * | 2/2022 | Foes | H01Q 1/125 |
| 2014/0147061 A1 | 5/2014 | Linnenkohl | |
| 2019/0023371 A1 | 1/2019 | Zimmerman | |

FOREIGN PATENT DOCUMENTS

EP  3242834 B1  11/2018

OTHER PUBLICATIONS

EP search report for EP20157769.9 dated Sep. 7, 2020.

* cited by examiner

*Primary Examiner* — Xanthia C Cunningham
(74) *Attorney, Agent, or Firm* — Getz Balich LLC

(57) ABSTRACT

A mounting device includes a first mount portion and a second mount portion. The first mount portion is in communication with a first pin extending along a first axis. The second mount portion is in communication with a pair of opposing second pins extending along a second axis different than the first axis. The second pins are in rotational communication with and extend outward from the first pin. The first and second mount portions are configured to translate along the first and second axes and rotate about the first and second axes with respect to one another.

18 Claims, 7 Drawing Sheets

MOUNTING DEVICE AND METHOD FOR MOUNTING COMPONENTS

This invention was made with Government support under FA8650-09-D-2923-DO0021 awarded by the United States Air Force. The Government has certain rights in this invention.

BACKGROUND

1. Technical Field

This disclosure relates generally to mounting devices, and more particularly to a devices for mounting a first component to a second component.

2. Background Information

When constraint in only one direction is required at a mount point between two components, a link or rod-type mounting device with spherical bearings at each end may conventionally be selected. However, in applications involving small clearances between the components to be mounted together, the conventional link mounting device may not fit within the available clearance space. Further, short link mounting devices may cause a rocking motion which can impart unintended stress on the mounting device as one or more parts of the mounting device thermally expand or contract. Accordingly, what is needed is an improved mounting device which can suitably mount two components together in a small clearance space while avoiding the stress-forming deficiencies of conventional mounting devices.

SUMMARY

According to an embodiment of the present disclosure, a mounting device includes a first mount portion and a second mount portion. The first mount portion is in communication with a first pin extending along a first axis. The second mount portion is in communication with a pair of opposing second pins extending along a second axis different than the first axis. The second pins are in rotational communication with and extend outward from the first pin. The first and second mount portions are configured to translate along the first and second axes and rotate about the first and second axes with respect to one another.

In the alternative or additionally thereto, in the foregoing embodiment, the first and second mount portions are configured to rotate about a third axis with respect to one another.

In the alternative or additionally thereto, in the foregoing embodiment, the first, second, and third axes are substantially perpendicular to one another.

In the alternative or additionally thereto, in the foregoing embodiment, the first and second axes are on a same plane.

In the alternative or additionally thereto, in the foregoing embodiment, the second pins are in rotational communication with the first pin via a spherical bearing.

In the alternative or additionally thereto, in the foregoing embodiment, the second pins extend from a rotatable body forming a perimeter about the spherical bearing.

In the alternative or additionally thereto, in the foregoing embodiment, the first and second mount portions are constrained from translation along the third axis with respect to one another.

In the alternative or additionally thereto, in the foregoing embodiment, the first, second, and third axes intersect at a position between the first and second mount portions.

According to another embodiment of the present disclosure, a mounting system includes a first component and a second component coupled to the first component by at least one mounting device. The at least one mounting device includes a first mount portion and a second mount portion. The first mount portion is in communication with a first pin extending along a first axis. The second mount portion is in communication with a pair of opposing second pins extending along a second axis different than the first axis. The second pins are in rotational communication with and extend outward from the first pin. The first and second mount portions are configured to translate along the first and second axes and rotate about the first and second axes with respect to one another.

In the alternative or additionally thereto, in the foregoing embodiment, the first and second mount portions are configured to rotate about a third axis with respect to one another.

In the alternative or additionally thereto, in the foregoing embodiment, the first, second, and third axes are substantially perpendicular to one another.

In the alternative or additionally thereto, in the foregoing embodiment, the first and second axes are on a same plane.

In the alternative or additionally thereto, in the foregoing embodiment, the second pins are in rotational communication with the first pin via a spherical bearing.

In the alternative or additionally thereto, in the foregoing embodiment, the second pins extend from a rotatable body forming a perimeter about the spherical bearing.

In the alternative or additionally thereto, in the foregoing embodiment, the first and second mount portions are constrained from translation along the third axis with respect to one another.

In the alternative or additionally thereto, in the foregoing embodiment, the first, second, and third axes intersect at a position between the first and second mount portions.

According to another embodiment of the present disclosure, a method for mounting a first component to a second component is provided. A first mount portion of a mounting device is attached to the first component. A second mount portion of the mounting device is attached to the second component. The first mount portion is in communication with a first pin extending along a first axis and the second mount portion is in communication with a pair of opposing second pins extending along a second axis different than the first axis. The second pins are in rotational communication with and extend outward from the first pin.

In the alternative or additionally thereto, in the foregoing embodiment, the second pins are in rotational communication with the first pin via a spherical bearing.

In the alternative or additionally thereto, in the foregoing embodiment, the second pins extend from a rotatable body forming a perimeter about the spherical bearing.

In the alternative or additionally thereto, in the foregoing embodiment, the method further includes coupling the first mount portion to the second mount portion.

The present disclosure, and all its aspects, embodiments and advantages associated therewith will become more readily apparent in view of the detailed description provided below, including the accompanying drawings.

DETAILED DESCRIPTION

Figure 1:
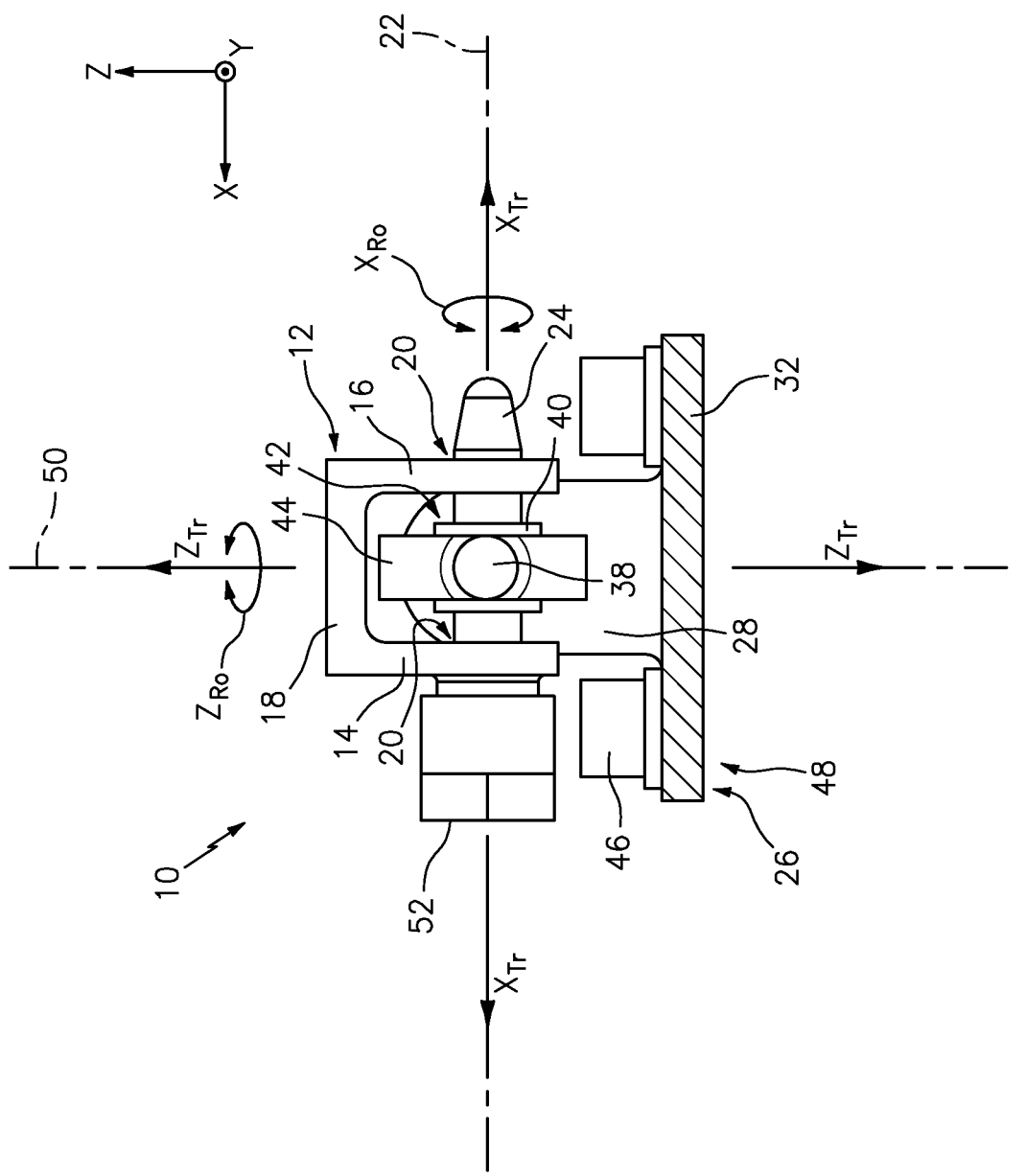
FIG. 1 illustrates a side cross-sectional view of an exemplary mounting device.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
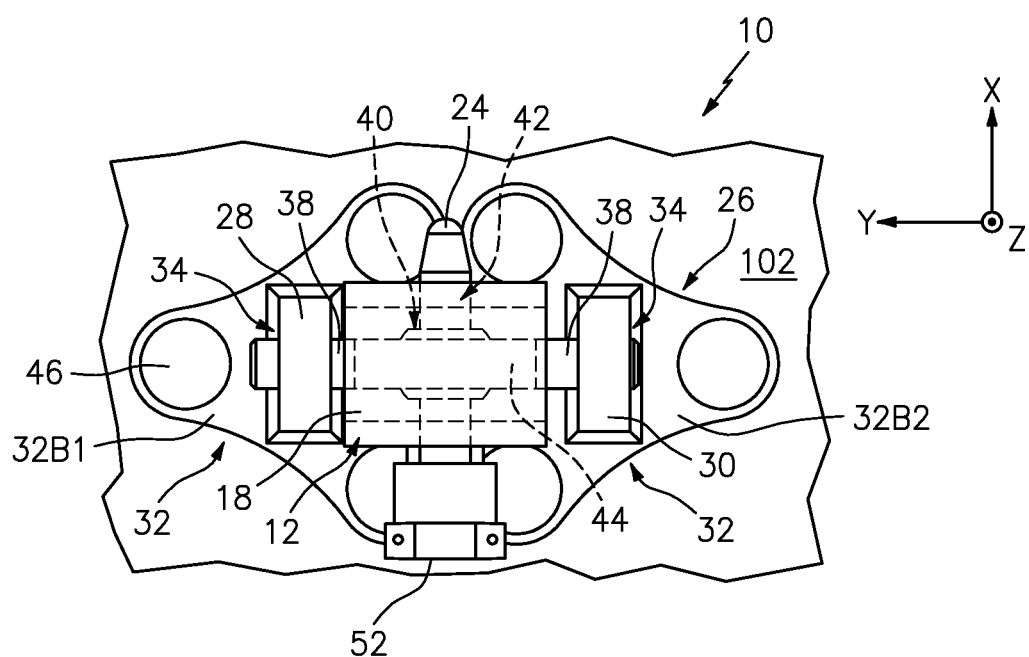
FIG. 2 illustrates a top cross-sectional view of an exemplary mounting device.
Figure 3:
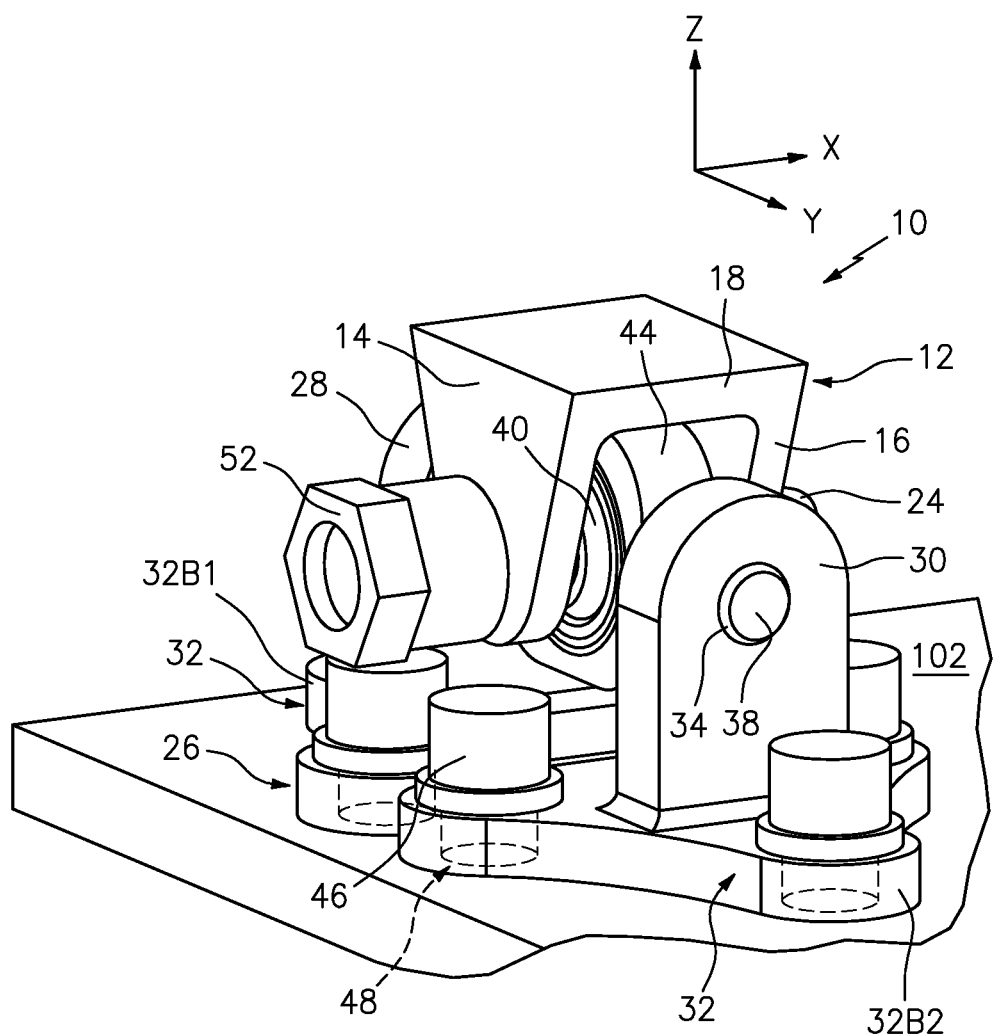
FIG. 3 illustrates a perspective cross-sectional view of the mounting device of FIG. 2.
Figure 4:
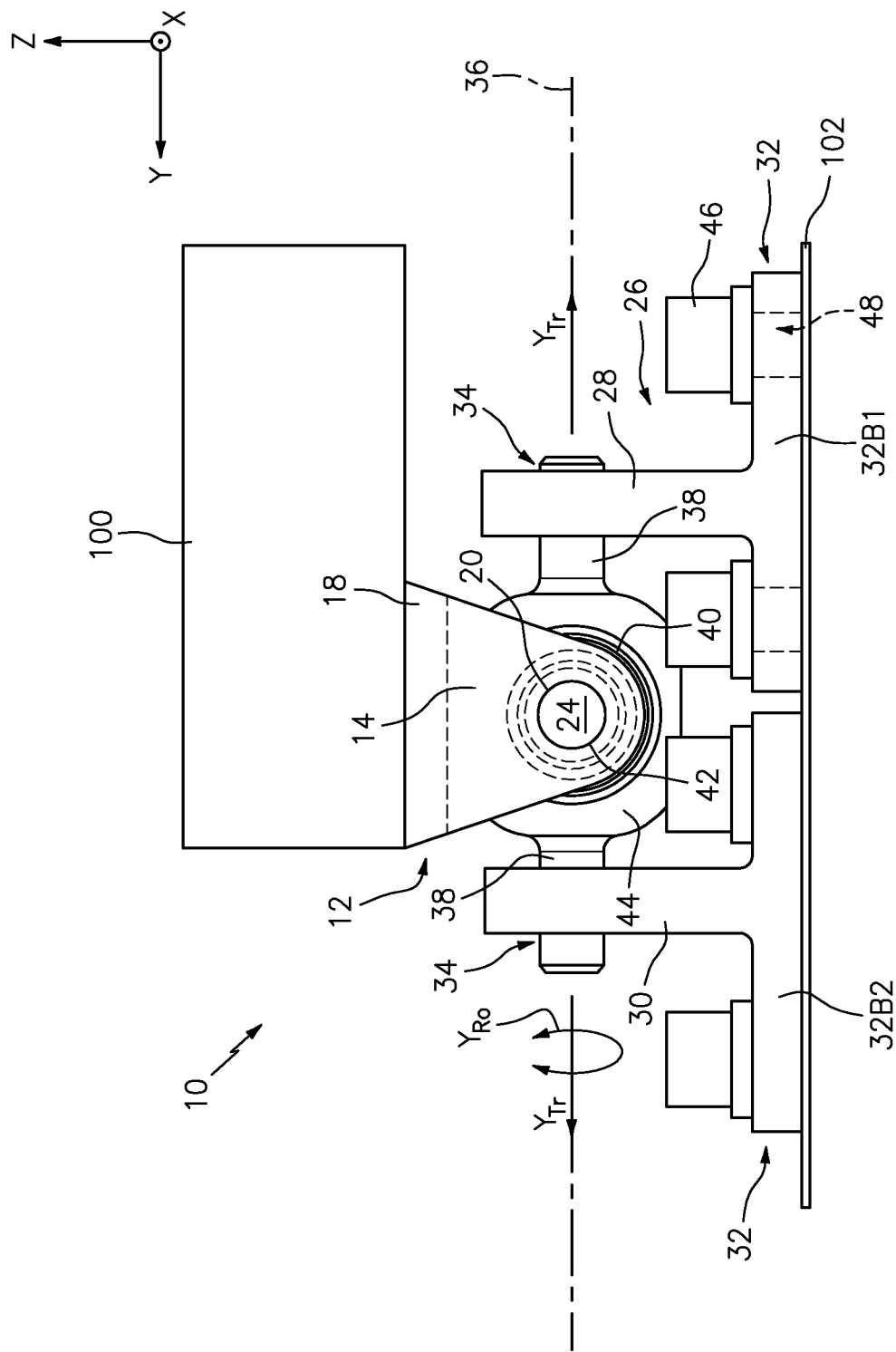
FIG. 4 illustrates a side cross-sectional view of the mounting device of FIG. 2.
Figure 5:
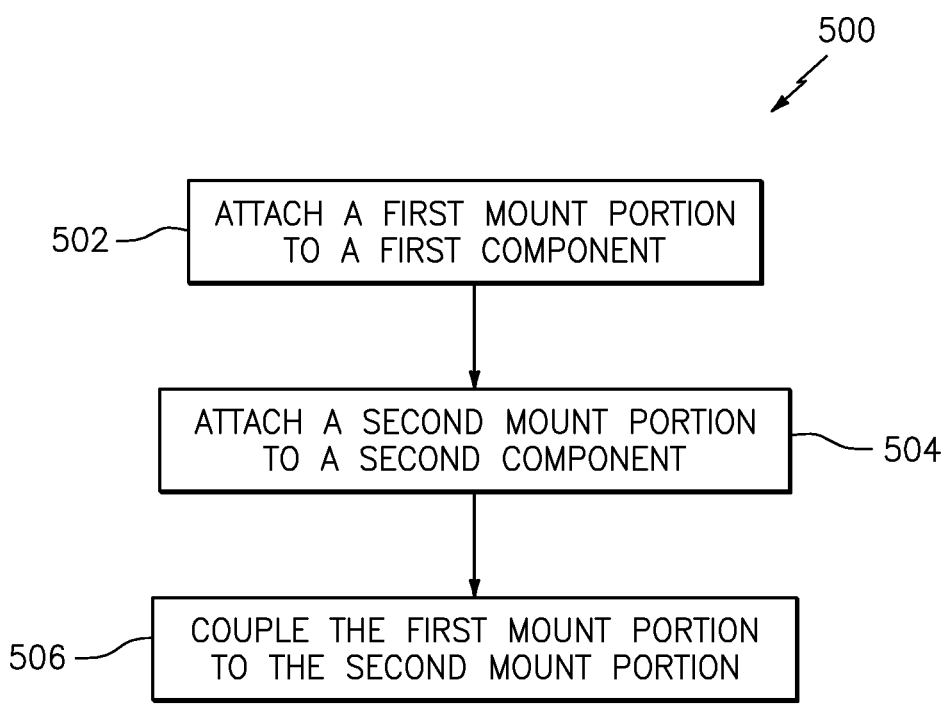
FIG. 5 illustrates a flowchart of a method for mounting a first component to a second component.

FIGS. 1-4 illustrate an exemplary mounting device 10 according to the present disclosure. The mounting device 10 may be used to mount two components, such as a first component 100 and a second component 102, to one another. As shown in FIG. 4, for example, the mounting device 10 may be attached to a surface of the first component 100 and an opposing surface of the second component 102. The mounting device 10 may be used alone or in combination with one or more other mounting devices of which one or more may be identical to or different than the mounting device 10.

The mounting device 10 includes a first mount portion 12 in communication with a second mount portion 26. As will be further discussed, relative motion between the first and second mount portions 12, 26 will be described herein in relation to the six degrees of freedom (i.e., the three translational $X_{Tr}$, $Y_{Tr}$, $Z_{Tr}$ and the three rotational $X_{Ro}$, $Y_{Ro}$, $Z_{Ro}$ degrees of freedom). The first mount portion 12 includes first and second brackets 14, 16 spaced from one another and extending outward in a common direction from a base 18. The first and second brackets 14, 16 may be substantially parallel to one another. Each of the first and second brackets 14, 16 includes a pin aperture 20 centered about a first axis 22 (illustrated herein as an X-axis). A first pin 24 extends through each of the pin apertures 20 along the first axis 22.

The second mount portion 26 includes first and second brackets 28, 30 spaced from one another and extending outward in a common direction from a base 32. The first and second brackets 28, 30 may be substantially parallel to one another. In some embodiments, the base 32 of the second mount portion 26 may be two or more separate base portions. For example, as shown in FIGS. 2-4, the first bracket 28 may extend from a first base portion 32B1 while the second bracket 30 may extend from a second base portion 32B2. Each of the first and second brackets 28, 30 includes a pin aperture 34 centered about a second axis 36 (illustrated herein as a Y-axis) which is different than the first axis 22. A pair of opposing second pins 38 extends through each of the pin apertures 34 along the second axis 36. The second pins 38 are configured to translate in direction $Y_{Tr}$ within the respective pin apertures 34. In some embodiments, the pin apertures 34 may include bushings or other suitable devices configured to minimize wear between the second pins 38 and the first and second brackets 28, 30.

In some embodiments, the first axis 22 and the second axis 36 may be substantially perpendicular. The first axis 22 and the second axis 36 may additionally or alternatively extend along a same geometric plane. As used herein, the term "substantially" with regard to an angular relationship refers to the noted angular relationship +/−10 degrees.

The mounting device 10 includes a spherical bearing 40 disposed about the first pin 24 between the first and second brackets 14, 16 of the first mount portion 12. The spherical bearing 40 includes a bearing aperture 42 extending through a centerline of the spherical bearing 40 along the first axis 22. The first pin 24 extends through the bearing aperture 42 between the first and second brackets 14, 16. The spherical bearing 40 is configured to translate in direction XT, along the first pin 24 and, therefore, the first axis 22, between the first and second brackets 14, 16 (see FIG. 1). Accordingly, the first and second mount portions 12, 26 may translate along the first axis 22 relative to one another. Similar to the pin apertures 34, the bearing aperture 42 may include a bushing or other suitable device configured to minimize wear between the spherical bearing 40 and the first pin 24.

The second pins 38 extend outward (i.e., along the second axis 36) from opposite sides of an annular rotatable body 44. The rotatable body 44 may be in rotational communication with and form a perimeter about the spherical bearing 40. Thus, the second pins 38 may be in rotational communication with and extend outward from the spherical bearing 40 and, hence, the first pin 24 which extends through the spherical bearing 40. The spherical bearing 40, rotatable body 44, and second pins 38 are configured to translate together in direction $Y_{Tr}$ along the second axis 36 between the first and second brackets 28, 30 of the second mount portion 26 based on the interface between the second pins 38 and the pin apertures 34 (see FIG. 4). Accordingly, the first and second mount portions 12, 26 may translate along the second axis 36 relative to one another. In some embodiments, the second pins 38 may be integral to the rotatable body 44 while in other embodiments the second pins 38 may be attached to the rotatable body 44, for example, by threaded attachment or another other suitable attachment means.

FIG. 1 shows a third axis 50 illustrated herein as a Z-axis. The first and second mount portions 12, 26 are constrained from translation along the third axis 50, in direction $Z_{Tr}$, with respect to one another (i.e., the position of the first and second mount portions 12, 26 with respect to one another is substantially fixed). However, the spherical bearing 40 may allow the first and second mount portions 12, 26 to rotate about the first axis 22, in direction $X_{Ro}$, the second axis 36, in direction $Y_{Ro}$, and the third axis 50, in direction $Z_{Ro}$, with respect to one another. Accordingly, the mounting device 10 according to the present disclosure may allow movement in five of the six degrees of freedom. In some embodiments, the third axis 50 may be substantially perpendicular to one or both of the first and second axes 22, 36. In some embodiments, the first, second, and third axes 22, 36, 50 may intersect at a position between the first and second mount portions 12, 26 (e.g., at a center position of the spherical bearing 40).

In some embodiments, the spherical bearing 40 may be omitted. For example, the first pin 24 may extend through the rotatable body 44 as well as the pin apertures 20 along the first axis 22. Thus, the rotatable body 44 may be in rotational communication with and form a perimeter about the first pin 24. Accordingly, rotation of the first and second mount portions 12, 26 in the $Z_{Ro}$ direction may be constrained with respect to one another (i.e., the mounting device 10 may allow movement in only four of the six degrees of freedom).

Referring to FIGS. 1-5, a method 500 for mounting the first component 100 to the second component 102 is disclosed. A surface of the base 18 of the first mount portion 12, opposite the first and second brackets 14, 16, is attached to the first component 100 (Step 502). A surface of the base 32, 32B1, 32B2 of the second mount portion 26, opposite the first and second brackets 28, 30, is attached to the second component 102 (Step 504). The base 32, 32B1, 32B2 of the second mount portion 26 may include one or more mount apertures 48 extending through the thickness of the base 32, 32B1, 32B2. The mount apertures 48 may provide access for one or more corresponding fasteners 46 to securely attach the second mount portion 26 to a surface of the second component 102 (see, e.g., FIG. 3). Attaching the second mount portion 26 to the second component 102 is not limited to the use of fasteners 46, accordingly, it should be understood that attaching the first and second mount portions 12, 26 to the respective first and second components 100, 102 may be accomplished by any suitable means conventionally known in the art.

In some embodiments, the first and second mount portions 12, 26 may not be coupled to one another when attached to the first and second components 100, 102, respectively. Accordingly, the first and second mount portions 12, 26 may subsequently be coupled to one another following attachment to the first and second components 100, 102 (Step 506). In some embodiments, the pin apertures 20 of the first mount portion 12 and the bearing aperture 42 of the second mount portion 26 may be aligned about a common axis (e.g., the first axis 22). The first pin 24 may then be inserted through the pin apertures 20 and the bearing aperture 42 to couple the first and second mount portions 12, 26.

Figure 6:
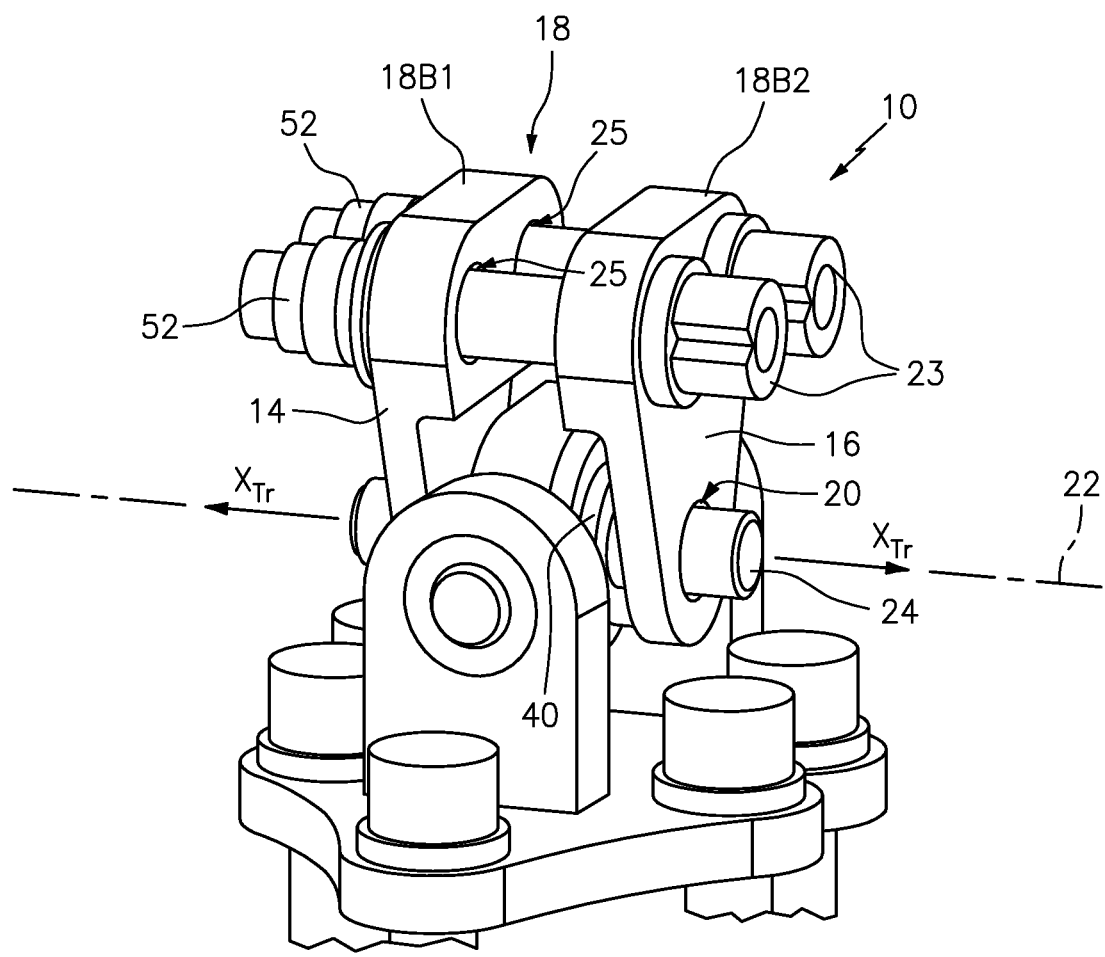
FIG. 6 illustrates a perspective view of an exemplary mounting device.
Figure 7:
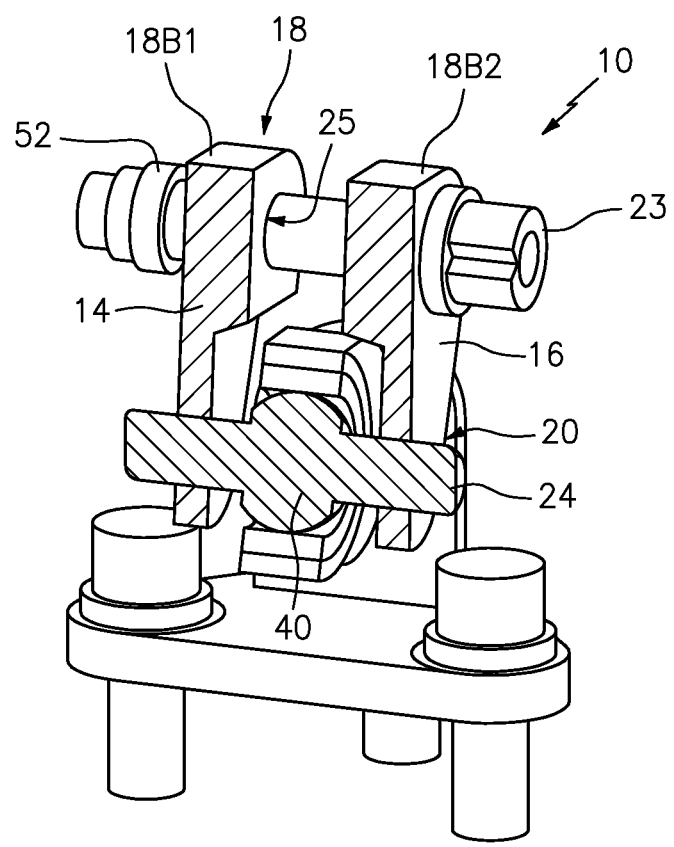
FIG. 7 illustrates a perspective cross-sectional view of the mounting device of FIG. 6.

Referring to FIGS. 6 and 7, in some embodiments, the base 18 of the first mount portion 12 may be two or more separate base portions. For example, the first bracket 14 may extend from a first base portion 18B1 while the second bracket 16 may extend from a second base portion 18B2. Each of the first and second brackets 14, 16 includes the pin aperture 20 centered about the first axis 22. In some embodiments, the first and second base portions 18B1, 18B2 may be coupled together by one or more fasteners 23 extending through respective apertures 25 in the first and second base portions 18B1, 18B2. In some embodiments, the one or more fasteners 23 may alternatively or additionally couple the first and second base portions 18B1, 18B2 to the first component 100. In some embodiments, the spherical bearing 40 and the first pin 24 may form an integral component such that the spherical bearing 40 and the first pin 24 are fixed relative to one another. In said embodiment, the first pin 24 may be configured to translate in direction $X_{Tr}$ within the respective pin apertures 20. Similar to the pin apertures 34, the pin apertures 20 may include bushings or other suitable devices configured to minimize wear between the first pin 24 and the first and second brackets 14, 16.

Referring to FIGS. 1-4, 6, and 7, one or more of the first pin 22, the second pins 38, and the fasteners 23 may be configured to receive one or more retention elements 52 provided to retain the pins 22, 38 in position within the respective first and second mount portion 12, 26. The pins 22, 38 may be configured to receive retention elements 52 on one or both ends. The retention elements 52 may be configured as one or more of a threaded nut (e.g., a cap nut), as shown in FIGS. 1-4, a locking pin (e.g., a cotter pin, split pin) extending through a corresponding aperture formed through a diameter of the pin 22, 38, or any other suitable retention means conventionally known in the art. In some embodiments, the pins 22, 38 may not include any retention elements 52.

The mounting device 10 according to one or more embodiments of the present disclosure may limit stresses imparted upon the mounting device 10, for example, in applications involving small clearances between components to be mounted together, as one or more parts of the mounting device 10 thermally expand or contract. For example, the present disclosure may allow linear expansion or contraction of one or more parts of the mounting device 10 along one or more of the first, second, and third axes 22, 36, 50 (e.g., movement in the x, y, and z-directions). For example, a conventional link-type mounting device that moves a first distance in an x-direction (e.g., as a result of thermal displacement) may also have off-axis movement of a second distance in a y-direction. For a relatively longer link (as measured in the z-direction), the off-axis movement may be negligible. However, for a relatively shorter link, the off-axis movement may no longer be negligible. For example, for a first link and a relatively shorter second link moving a same first distance in the x-direction, the second link may have a greater distance of off-axis movement in the y-direction. This increased off-axis movement may result in greater stress in the shorter link. The embodiments of the present disclosure may have zero off-axis movement as a result of movement in one or more of the x, y, and z-directions.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A mounting device comprising:
   a first mount portion in communication with a first pin extending along a first axis; and
   a second mount portion in communication with a pair of opposing second pins extending along a second axis different than the first axis, the second pins in rotational communication with and extending outward from the first pin,
   wherein the first and second mount portions are configured to translate along the first and second axes and rotate about the first and second axes with respect to one another, and wherein the first and second mount portions are configured to rotate about a third axis with respect to one another.

2. The mounting device of claim 1, wherein the first, second, and third axes are substantially perpendicular to one another.

3. The mounting device of claim 1, wherein the first and second axes are on a same plane.

4. The mounting device of claim 1, wherein the second pins are in rotational communication with the first pin via a spherical bearing.

5. The mounting device of claim 4, wherein the second pins extend from a rotatable body forming a perimeter about the spherical bearing.

6. The mounting device of claim 1, wherein the first and second mount portions are constrained from translation along the third axis with respect to one another.

7. The mounting device of claim 1, wherein the first, second, and third axes intersect at a position between the first and second mount portions.

8. A mounting system comprising:
a first component; and
a second component coupled to the first component by at least one mounting device, the at least one mounting device comprising:
a first mount portion in communication with a first pin extending along a first axis; and
a second mount portion in communication with a pair of opposing second pins extending along a second axis different than the first axis, the second pins in rotational communication with and extending outward from the first pin,
wherein the first and second mount portions are configured to translate along the first and second axes and rotate about the first and second axes with respect to one another, and
wherein the first, second, and third axes intersect at a position between the first mount portion and second mount portion along the third axis.

9. The mounting system of claim 8, wherein the first and second mount portions are configured to rotate about a third axis with respect to one another.

10. The mounting system of claim 9, wherein the first, second, and third axes are substantially perpendicular to one another.

11. The mounting system of claim 9, wherein the first and second axes are on a same plane.

12. The mounting system of claim 9, wherein the first and second mount portions are constrained from translation along the third axis with respect to one another.

13. The mounting system of claim 8, wherein the second pins are in rotational communication with the first pin via a spherical bearing.

14. The mounting system of claim 13, wherein the second pins extend from a rotatable body forming a perimeter about the spherical bearing.

15. A method for mounting a first component to a second component comprising:
attaching a first mount portion of a mounting device to the first component; and
attaching a second mount portion of the mounting device to the second component,
wherein the first mount portion is in communication with a first pin extending along a first axis and the second mount portion is in communication with a pair of opposing second pins extending along a second axis different than the first axis, the second pins in rotational communication with and extending outward from the first pin,
wherein the first and second mount portions are configured to rotate about a third axis with respect to one another.

16. The method of claim 15, wherein the second pins are in rotational communication with the first pin via a spherical bearing.

17. The method of claim 16, wherein the second pins extend from a rotatable body forming a perimeter about the spherical bearing.

18. The method of claim 15, further comprising coupling the first mount portion to the second mount portion.

* * * * *